United States Patent

Burns

[15] 3,701,984

[45] Oct. 31, 1972

[54] MEMORY SUBSYSTEM ARRAY

[72] Inventor: Joseph Richard Burns, Trenton, N.J.

[73] Assignee: RCA Corporation

[22] Filed: March 5, 1971

[21] Appl. No.: 121,368

[52] U.S. Cl........340/173 R, 340/172.5, 340/173 AM

[51] Int. Cl. ..........................................G11c 15/00

[58] Field of Search.........340/172.5, 173 AM, 173 R

[56] References Cited

UNITED STATES PATENTS

| | | | |
|---|---|---|---|
| 3,339,181 | 8/1967 | Singleton et al. | 340/173 |
| 3,402,394 | 9/1968 | Koerner | 340/173 |
| 3,465,303 | 9/1969 | Koerner | 340/173 |
| 3,483,528 | 12/1969 | Koerner | 340/173 |

*Primary Examiner*—Terrell W. Fears
*Attorney*—H. Christoffersen

[57] ABSTRACT

Memory subsystem used with a main storage memory for storing data signals representing blocks of information arranged in words. Digit lines coupled in parallel to all memory subsystems carry block address signals which are compared to associative word signals stored in each memory subsystem. If the block address signals match the associative word signals in one of the memory subsystems, the data signals are retrieved from the memory subsystem containing the matching associative word. If no memory subsystem contains a matching associative word, the information addressed is retrieved from the main storage memory and the data signals and block address signals are transferred to a selected memory subsystem and stored.

4 Claims, 6 Drawing Figures

PATENTED OCT 31 1972 3,701,984

SHEET 1 OF 4

INVENTOR.
Joseph R. Burns
BY H. Christoffersen
ATTORNEY

LEGEND ⫽⫽ = MULTIPLE CONDUCTOR CABLE

INVENTOR.
Joseph R. Burns

BY H. Christofferson

ATTORNEY

INVENTOR.

Joseph R. Burns

BY H. Christoffersen

ATTORNEY

INVENTOR.
Joseph R. Burns
BY
W. Christoffersen
ATTORNEY

MEMORY SUBSYSTEM ARRAY

BACKGROUND OF THE INVENTION

The speed and size of a memory system associated with an electronic computer usually limits the speed at which the computer can process data. The faster the memory system, the faster will be the processing time of the computer. The cost of increasing the speed of a memory system while maintaining a large capacity is often not economical nor feasible.

It has been demonstrated that the locations used during the execution of a program by a computer tend to cluster around a small group of addresses. To take advantage of this, there has evolved a combination of large capacity memories having moderate speeds and small capacity memories having very fast speeds. During the execution of a program, the computer addresses the small memories to determine whether the data are in the small memories. If so, the data are retrieved from the proper small memory and used by the computer. If the data addressed by the computer are not in one of the small memories, the computer retrieves the data from the large memory. The retrieved data is transmitted to both the processing unit of the computer and one of the small memories for storage.

Initially, the small memories will contain no data so that each request for data from the computer will necessitate retrieval of the addressed data from the main storage memory. Each data retrieval will cause one of the small memories to be filled or partially filled. Eventually, the small memories will be completely filled with data which has been retrieved from the main storage memory so that when another retrieval from the main storage memory is required, it will be necessary to designate which of the small memories will have its stored data replaced by the newly retrieved data. There are several ways of designating this, the principal ones being FIFO (First In, First Out) and frequency of use. The FIFO method replaces the oldest data in the small memories, i.e., that data which has been in one of the small memories for the longest period of time, with the newly retrieved information. The frequency of use method replaces that data in the small memories which has been used least by the computer.

The present invention describes a small, fast memory array which is especially suitable for use as a small memory in a memory system as described above. The array comprises a memory subsystem of which almost any number can be coupled to the system. The construction of the invention is especially well suited to integrated circuit techniques.

BRIEF DESCRIPTION OF THE INVENTION

A memory system, having a control section, a main storage section, a register for storing data, and an address register partitioned into a word select portion and a block select portion, has at least one memory subsystem for storing data words in a plurality of elements arranged in rows. The memory subsystem also contains an associative word register that stores a block address word. Data words in the memory subsystem are selected by the word select portion of the address register when the block select portion of the address register is the same as the associative word in the memory subsystem.

DETAILED DESCRIPTION OF THE INVENTION

Figure 1:
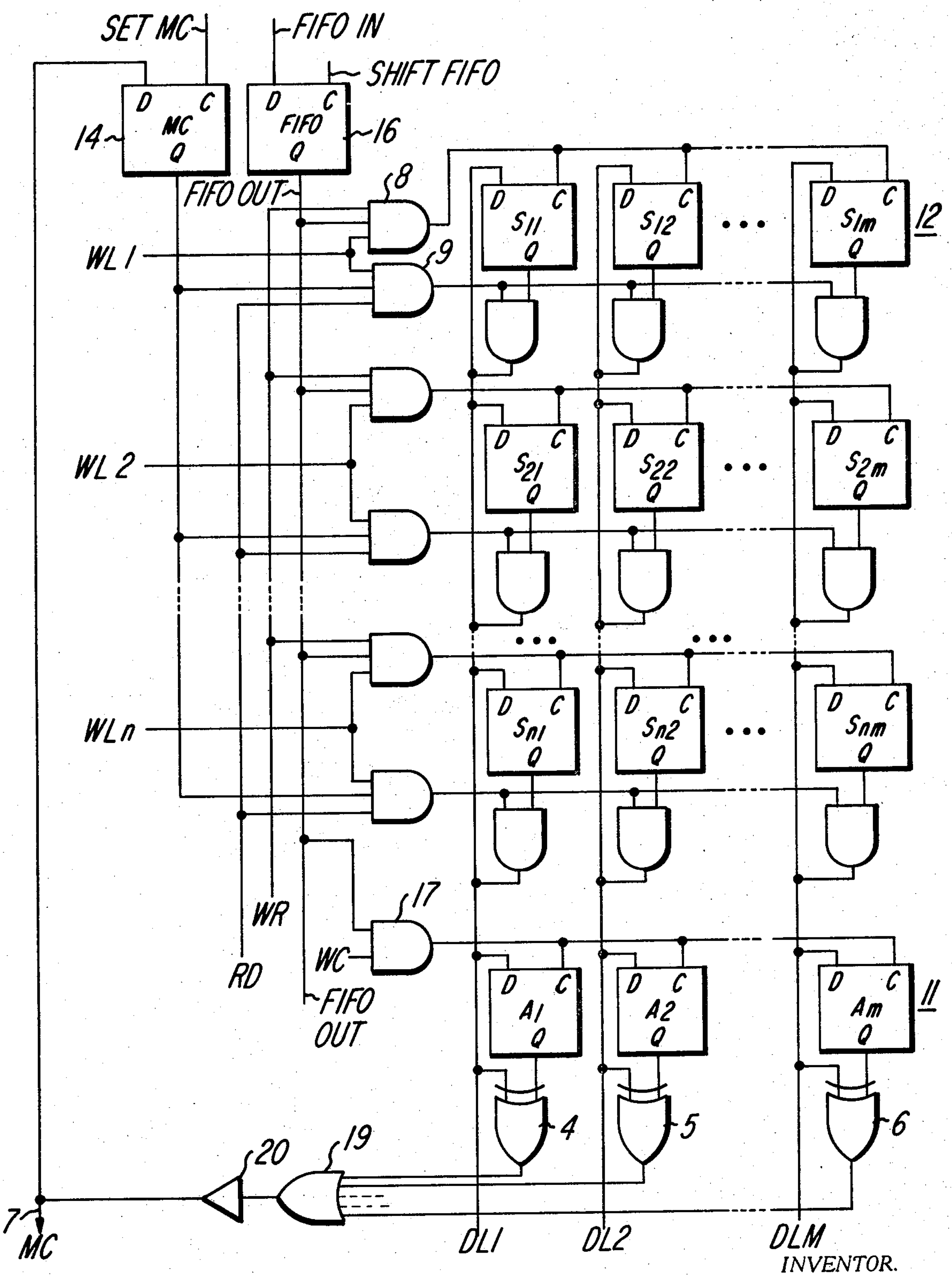
FIG. 1 is a logic diagram of one embodiment of the invention.

One embodiment of the invention is shown in FIG. 1 as an array of $n$ rows of data storage flip-flops, each row comprising a word of $m$ bits. Also included is a row of flip-flops 11 for storing an associative word. The associative word is the main storage memory block address of the data stored in an associated array (not shown).

The operation of the circuit shown in FIG. 1 and subsequent Figures is described in terms of binary digital signals. Binary digital signals have a value of 0 or 1, a 0 conventionally being the lower of two voltage levels and a 1 being the higher.

An AND gate, such as the AND gate 8 in FIG. 1, has an output signal of 1 when all its input signals have the value of 1. If any input signal has the value of 0, the output signal of the AND gate is 0.

An OR gate, such as the OR gate 19 in FIG. 1, has an output signal of 0 when no input signal has the value of 1 and an output signal of 1 when any one or more input signals have a value of 1.

An Exclusive-OR gate, such as the Exclusive-OR gate 4 of FIG. 1, has an output signal of 1 when only a single one of its input signals has the value of 1. When the input signals are 1,1 or 0,0 the output signal has the value 0.

An inverter, such as the inverter 20 in FIG. 1, complements or inverts its input signal so that if the input signal is 0, the output signal is 1; if the input signal is 1, the output signal is 0.

Flip-flops are binary storage devices. A flip-flop has two output signals, labelled conventionally Q and Q′, the values of which are complementary to each other. When the Q output signal is 1 and the Q′ output signal is 0, the flip-flop is in the set state. When the Q′ output signal is 1 and the Q output signal is 0, the flip-flop is in the reset state.

There are several types of flip-flops; the types used in describing the present invention are the clocked J-K type, the D-type, and the SRT-type.

The clocked J–K type flip-flop has three input terminals — a J-input, a K-input, and clock input. The input signals control the state of the flip-flop only during the application of a clock input signal. A clock input signal (or clock pulse) that occurs when the J- and K-input signals are both 0 does not change the state of the flip-flop. If the J-input signal has a value of 1 and the K-input signal has a value of 0, a clock pulse will cause the flip-flop to switch to the set state. If the J-input signal is 0 and the K-input signal is 1, then a clock pulse will cause the flip-flop to switch to the reset state. If both the J- and K- input signals are 1, a clock pulse will cause the flip-flop to change its state to that opposite from the state just prior to the clock pulse.

A d-type flip-flop has a D-input terminal and a clock input terminal. During a clock pulse, the flip-flop switches to the set state if the D-input signal is 1 and the reset state if the D-input signal is 0.

An SRT flip-flop (Set-Reset-Trigger) switches to the set state when the S-input signal has a value of 1 and to the reset state when the R-input signal is 1. When both the S- and R-input signals are 1, the state of the flip-flop is unpredictable. If the S- and R-input signals are both 0, no change of state occurs. A 1 signal applied to the T-input terminal of an SRT flip-flop causes the flip-flop to change its state to that opposite from the state just prior to the application of the T-input signal.

In FIG. 1, the data words and the associative word are stored in separate rows of D-type flip-flops. The D-input terminals of all the data storage flip-flops and the associative word register 11 are coupled to digit lines so that the first flip-flop of each word is coupled to the digit line DL1; the second, to the digit line DL2; and so on. The output terminal of each data flip-flop is coupled through an AND gate to its corresponding digit line.

Each digit line is also coupled to an input terminal of an Exclusive-OR gate, the other input terminal of which is connected to the corresponding Q output terminal of the associative word register 11.

Identified with each row of data words is a word line. The word line selects the write-in or read-out gates for each data word, such as the AND gates 8 and 9, respectively, for the first row.

The data registers are described as being arranged in rows and columns. In construction, however, the stages can be arranged with any convenient geometrical relationship to one another. For purposes of illustration, however, the data registers are described as being arranged in rows and columns, each row representing a data word and each column representing a digit position.

There are $m + n + 8$ external connections to the circuit shown in FIG. 1. There are $n$ word lines, one for each data word. In the operation of the system of which the circuit shown in FIG. 1 is a part, not more than one of the $n$ word lines will be activated at one time.

The $m$ digit lines are used for transferring data into and out of the array and for addressing the array as will be explained below in greater detail.

The circuit shown in FIG. 1 includes an MC flip-flop 14 and a FIFO flip-flop 16.

The MC flip-flop is set by a SET MC signal, which is coupled to all the memory subsystems, when the block portion of the address signals on the digit lines match the associative word signals stored in the associative word register 11. The output terminals of the Exclusive-OR gates coupled to the digit lines and flip-flops of the associative word register 11 each provide a different input signal to an OR gate 19. The output signal of the OR gate 19 is coupled to the input terminal of the inverter 20, the output terminal of which is coupled to the D-input terminal of the MC flip-flop 14. The signal on the MC output terminal 7 has a value of 1 when the signals stored in the associative word register 11 are the same as the signals from the block address portion of the address register.

The FIFO flip-flop 16 has three terminals. One is FIFO-IN, another is FIFO-OUT, and the other is SHIFT FIFO. The FIFO-IN terminal is coupled to the FIFO-OUT terminal of the preceding memory subsystem and the FIFO-OUT terminal is coupled to the FIFO-IN terminal of the following memory subsystem. The SHIFT FIFO terminals of all of the memory subsystems are coupled together.

The WC, RD (read-out) and WR (write-in) terminals will be described in more detail below.

Figures 2, 3:
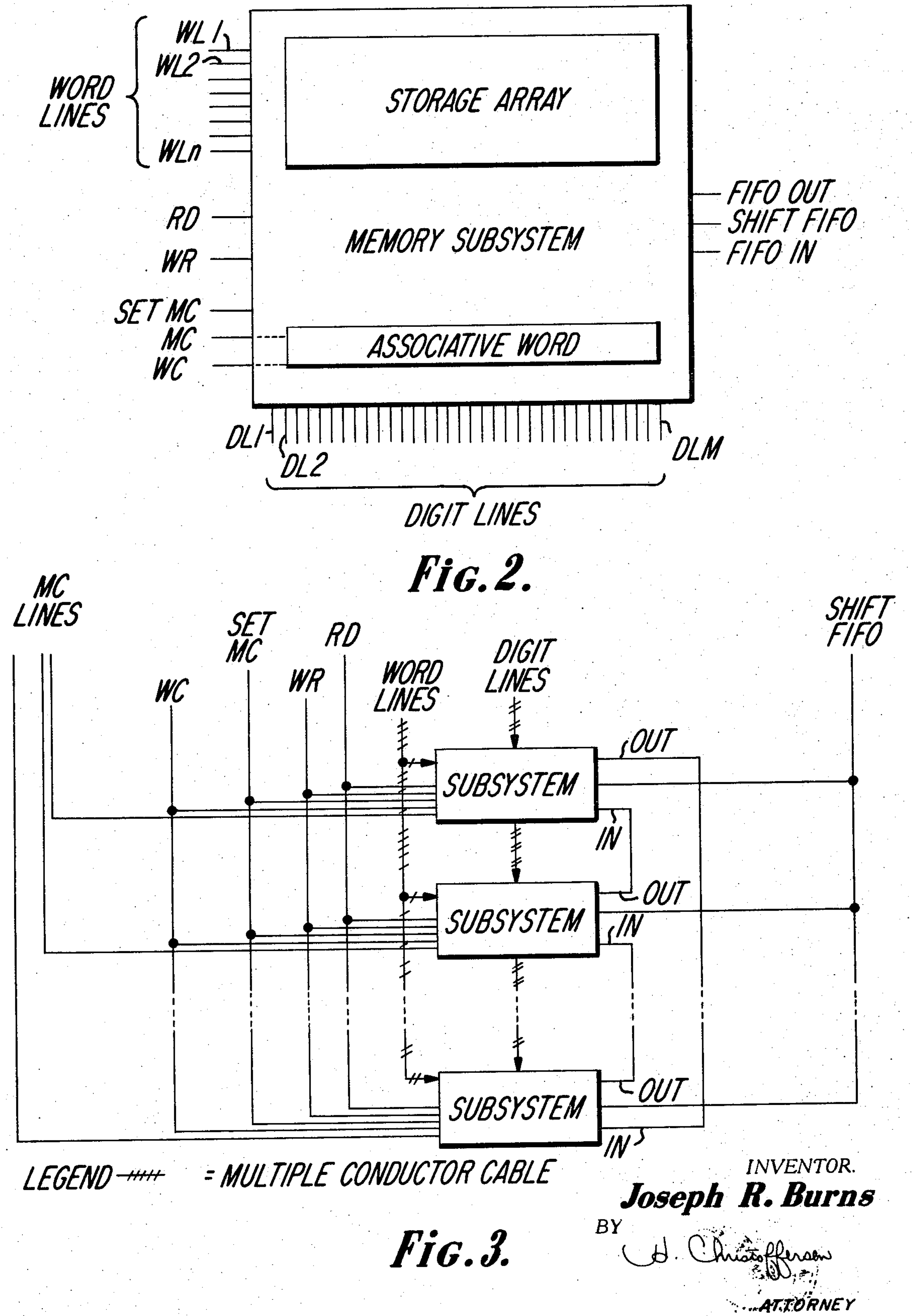
FIG. 2 is a block diagram symbol representing the logic circuit of FIG. 1.
FIG. 3 is a block diagram indicating the interconnections between a plurality of memory subsystems.

FIG. 2 is a block diagram symbol representing the circuit shown in FIG. 1.

In FIG. 3, the interconnections among the various memory subsystems are shown. The digit lines, word lines, and the WR, RD, SET MC, SHIFT FIFO, and WC lines are connected to each subsystem in parallel. The FIFO-IN and FIFO-OUT lines are connected serially as described above. Each MC line is returned individually to the memory control section. The operation of the circuit shown in FIG. 1 will now be described in greater detail.

When a data word is to be retrieved from the memory, the signals representing the block portion of the address register are coupled to all the memory subsystems through the digit lines. The word portion of the address is decoded to activate one of the $n$ word lines.

After the block address portion signals of the address register have been applied to the digit lines, the SET MC signal is applied to all the memory subsystems. If one of the memory subsystems has an associative word in its associative word register 11 that matches the block address portion of the address register, the MC flip-flop 14 of that memory subsystem will be set and the MC signal will have a value of 1.

The comparison of the signals stored in the associative word register 11 and the block address portion signals of the address register is performed by the Exclusive-OR gates, such as the Exclusive-OR gates 4, 5 and 6 shown in FIG. 1.

If the output signals of all the Exclusive-OR gates are 0, there is a "match" between the signals stored in the associative word register and the block address present on lines DL1, DL2, . . .,DLm. In this case, the output signal of the OR gate 19 will also be 0. The 0 output signal of the OR gate 19 is coupled to the input terminal of the inverter 20, the output signal of which will be 1. The output signal of 1 from the inverter 20 is applied to the D-input terminal of the MC flip-flop 14 so that when the input signal to the clock terminal, SET MC, is 1, the MC flip-flop 14 will be set. The output signal of the inverter 20 is also the MC signal to the control section of the system.

If the value of the output signal of any flip-flop in the associative word register 11 is different from the value of the signal on the associated digit line, the output signal of the associated Exclusive-OR gate will have a value of 1. If OR gate 19 has any input signal with a value of 1, the output signal will be 1 and consequently, the output signal of the inverter 20 will be 0. The associated MC flip-flop 14 will, therefore, be reset by the SET MC signal and the MC output signal 7 will be 0.

The MC output signal 7 from all of the memory subsystems is used by the control section of the system to indicate whether the addressed data block is in any of the memory subsystems. If an MC signal is received from one of the memory subsystems, a read signal (RD) is applied to all the subsystems to prime all of the row read-out gates and the block address signals are removed from the digit lines DL1–DL*m*. In FIG. 1, assuming that the word line WL1 is activated, the input terminal of the AND gate 9 coupled to WL1 will be primed. If the MC flip-flop 14 has been set, another input terminal of the AND gate 9 will be primed by the Q output signal of the MC flip-flop. Therefore, when the RD signal occurs, the output signal of the AND gate 9 will have a value of 1 and prime the output gates of the data storage flip-flops in the first row so that the signals stored in the data word register 12 will be applied to the corresponding digit lines. The data signals can then be accepted by the data registering means of the memory system.

If, however, none of the memory subsystems contains an associative word that matches the block portion of the address register, then it will be necessary to retrieve the addressed data from the main storage memory and to write all the data words associated with the addressed block into one of the memory subsystems. The FIFO flip-flop will be set in the memory subsystem having the oldest data. FIG. 3 shows that the FIFO bit is shifted cyclically through all of the memory subsystems in response to the SHIFT FIFO signal. The SHIFT FIFO signal occurs after data has been written into the memory subsystem in which the FIFO flip-flop is set. In the initial phase of filling the subsystems with data, the FIFO bit will be shifted from the first to the last memory subsystem in sequence and then from the last to the first memory subsystem. Thus, the FIFO flip-flop will be set in the memory subsystem storing the oldest data after the subsystems have been filled with data. Initially, it will be set in an empty subsystem.

Assuming that the circuit of FIG. 1 has the FIFO flip-flop 16 set, the block of data words will be written into the data registers of this circuit. First, the block address present on the digit lines is written into the associative register 11 as follows. When none of the MC output signals of the subsystems indicates that the addressed block is in one of the memory subsystems, a WC signal, which is coupled to all of the memory subsystems, including the one of FIG. 1, is generated. This primes one input terminal of the AND gate 17, the other output of which is the Q output signal from the FIFO flip-flop which has been assumed to be set. The output signal of the AND gate 17 provides a clock input pulse to all of the flip-flops in the associative word register 11, causing the signals on the digit lines (the block address) to be stored in the corresponding flip-flops of register 11. The block address signals are then removed from the digit lines.

In the control section of the system, the word line WL1 is activated. When the data word from the main storage memory is retrieved and appears as signals on the digit lines, the WR signal will prime the write-in gates for all rows including the AND gate 8. In the memory subsystem of FIG. 1 in which the FIFO flip-flop is set, the WR signal also has the value 1 so that AND gate 8 is enabled and the flip-flops of the first row all receive a clock signal (C=1) input. In response thereto, the data signals on the digit lines become stored in the first row of flip-flops.

The word address portion of the address will then be incremented by 1 so that word line WL2 is activated. When the second data word of the addressed data block is retrieved from the main storage memory and applied as signals to the digit lines, the data signals will be gated by the next WR signal into the second row of data flip-flops. This process is repeated until all *n* data words of the addressed data block have been stored in the memory subsystem.

The SHIFT FIFO signal is then activated to shift the FIFO bit into the following memory subsystem.

From the description of the illustrated embodiment of the invention, several general requirements for a control section of a memory system utilizing the circuit of the invention can be enumerated. The control section must accept an address from the computer or other control device. The block portion of the address must be applied to the digit lines and the word portion of the address must be decoded into one of the *n* word lines. If the desired data is not in any memory subsystem, the control section must retrieve from the main storage memory the block of data containing the addressed data word. As the successive data words are retrieved from the main memory, the word lines WL1 through WL*n* must be cycled and the data word addressed by the computer recognized and transmitted to the computer. The control section must also generate various control signals at the proper time.

Figure 4:
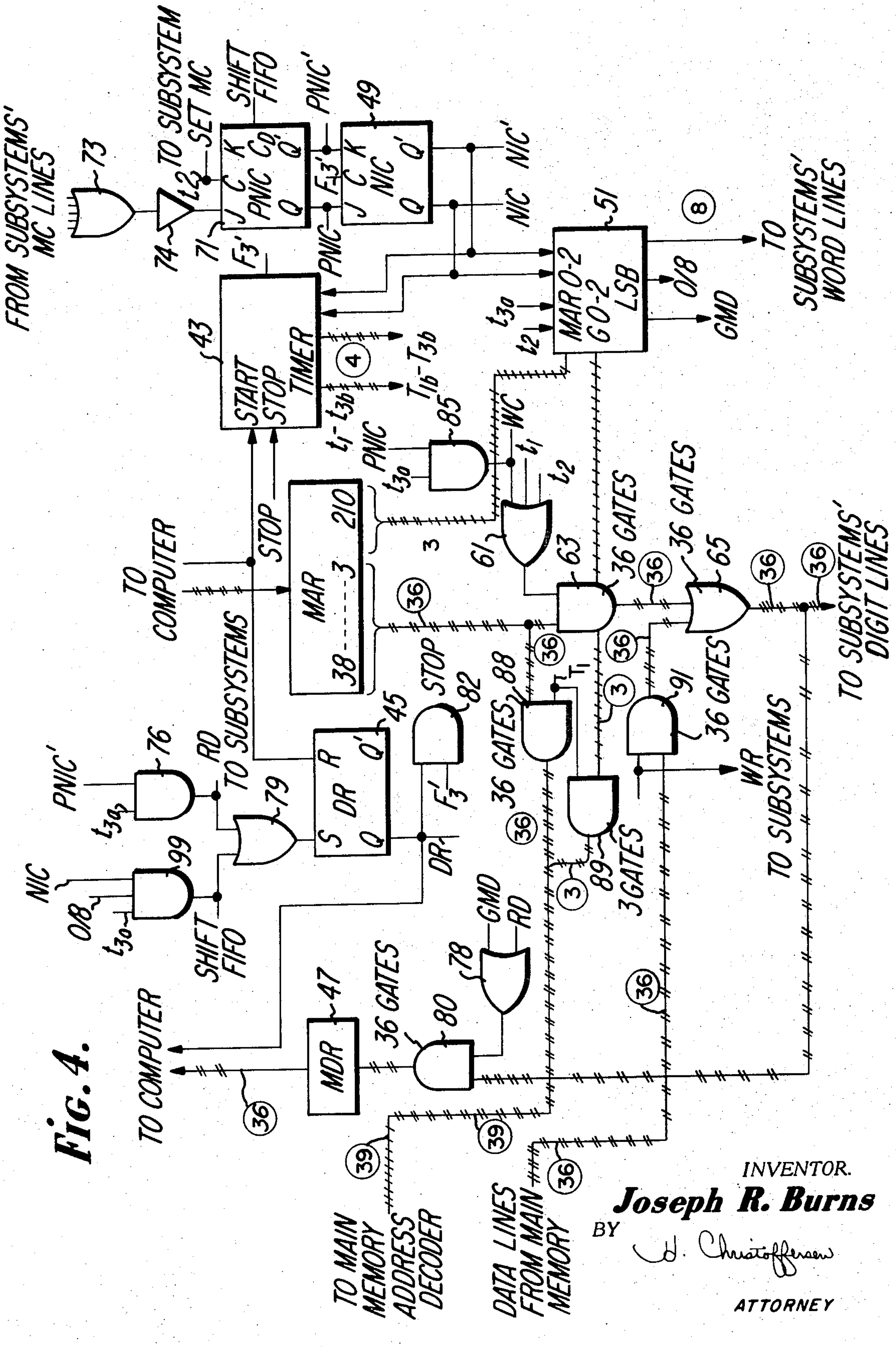
FIG. 4 is a logic diagram of the control and register sections of a memory system using the invention.

An example of a control section of a memory system that could be used with the illustrated embodiment of the invention is shown in FIG. 4. The operation of the control section is included to point out more clearly the operation of the invention.

The control section shown in FIG. 4 is for a system having 36 bits per data word, 39 address bits, and eight data words per block. Therefore, in the illustrated example, each memory subsystem will store eight data words.

The address signals from the computer are accepted by the MAR (MEMORY ADDRESS REGISTER) 41. Another signal is provided by the computer to start a timer 43 and to reset a DR (DATA READY) flip-flop 45. The DR flip-flop 45 when set provides a signal to the computer indicating that the addressed data is in a MDR (MEMORY DATA REGISTER) 47. The data to the computer will be transmitted from the MDR 47 by the computer when the DR signal indicates the data is ready.

As state previously, the computer provides a start signal to the timer 43 when the address signals have been transmitted from the computer to the MAR 41. The timer 43 is shown in greater detail in FIG. 6. The timer 43 selectively generates one of two groups of output time pulses: $t_1$, $t_2$, $t_{3a}$ and $t_{3b}$; or $T_1$, $T_2$, $T_{3a}$ and $T_{3b}$. The two groups of time pulses are mutually exclusive, i.e., only one group is generated at a time. The time pulses are generated in sequence repeatedly until stopped by a STOP signal to the timer 43.

The group of time pulses designated by lower case letters, i.e., $t_1$, etc., is the fast group. This group is used to check the memory subsystems to see if the addressed data is contained in one of them and is also used to retrieve the addressed data from one of the memory subsystems.

The other group of time pulses, designated by upper case letters, $T_1$, etc., is used to retrieve data from the main memory. The slow group of time pulses is required when reading from the main memory because of its slower response. In the circuit shown in FIG. 6, the slow group of time pulses occurs at one-fourth the rate of the fast group.

Figure 6:
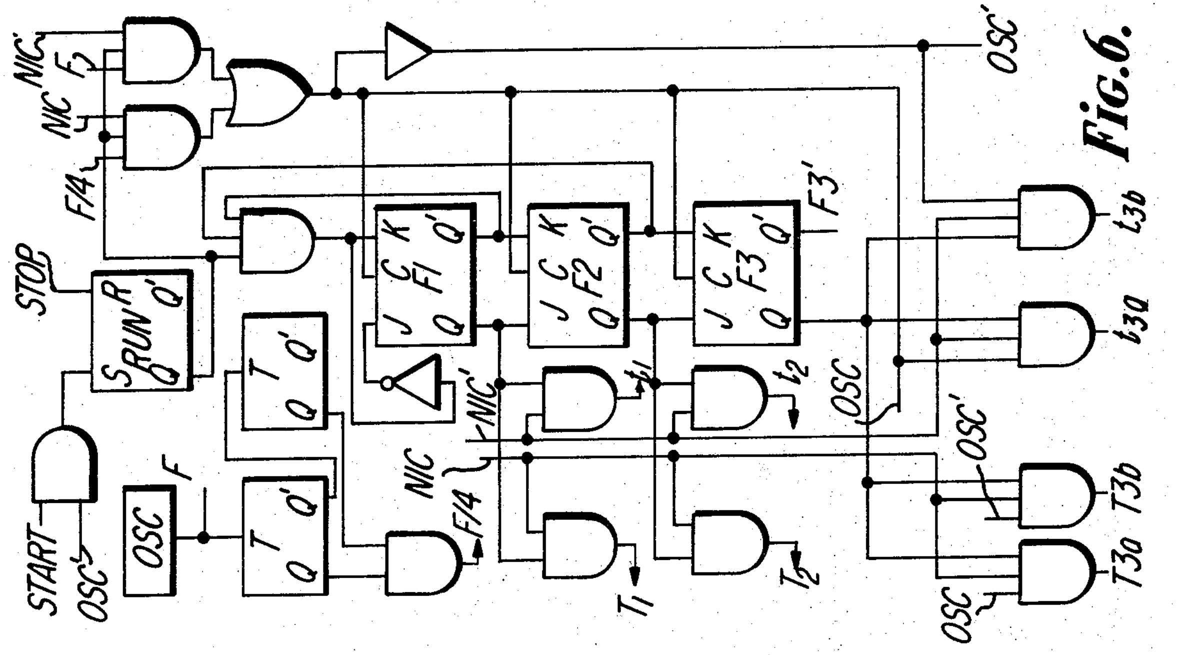
FIG. 6 is a logic diagram showing the details of a timer used in the control section.

The operation of the timer shown in FIG. 6 is obvious to one skilled in the art and need not be described in greater detail. The important characteristics of the timer in relation to the circuit of the invention are: it can be started and stopped by external signals; it will generate a fast or slow group of time pulses depending on whether the data is in one of the memory subsystems; it will generate a special time signal F3' which occurs at the end of the last time pulse of each cycle, viz., after $t_{3b}$ or $T_{3b}$.

Whether the addressed data is in one of the memory subsystems is indicated by the output signals of a PNIC flip-flop 71 and an NIC flip-flop 49. The Q' output signals of the flip-flops have a value of 1 if the addressed data is in one of the memory subsystems; the Q output signals have a value of 1 if the addressed data is not in one of the memory subsystems. The operation of the NIC flip-flop 49 and the PNIC flip-flop 71 will be covered in more detail in the description below.

Figure 5:
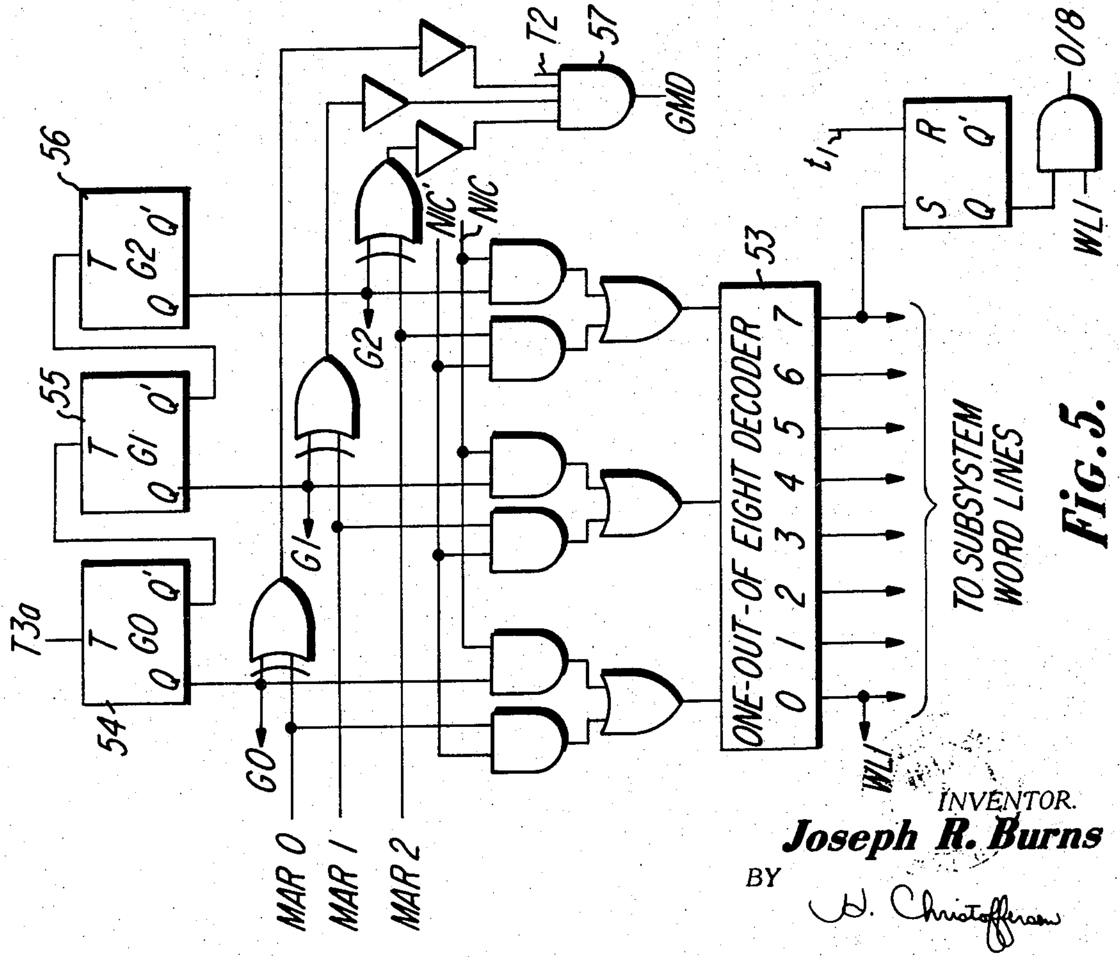
FIG. 5 is a logic diagram of a Least Significant Bit circuit used in the control section.

The logic network of the control section in FIG. 4 includes an LSB (LEAST SIGNIFICANT BIT) circuit 51. This circuit controls the three least significant bits of the address which determines which word in the block is being addressed. The LSB circuit 51 is shown in greater detail in FIG. 5. The output signals of a one-out-of-eight-decoder 53 are coupled to the memory subsystems' word lines. The operation of the decoder 53 is well known in the art and need not be described in greater detail. The 0 output signal of the decoder 53, which is coupled to the word line WL1 of the subsystems' word lines, generates a signal 0/8.

A GMD signal is generated by the LSB circuit 51 to indicate that the word retrieved from the main memory is the word addressed by the computer. When retrieving the data from the main memory, the three least significant bits of the address are taken from the output signals of the flip-flops 54, 55 and 56 comprising a counter. The counter counts from 0 to 7 in binary signals and the output signals of the flip-flops 54, 55 and 56 are labelled GO, G1 and G2 in ascending order. The three least significant bits from the MAR 41 are labelled MARO, MAR1, and MAR2 in ascending order. When the addressed data word is in one of the memory subsystems, the input signals to the one-out-of-eight-decoder 53 are taken from the three least significant bits of the MAR 41. When the addressed data word is not in one of the memory subsystems, the input signals to the decoder 53 are taken from the counter flip-flops 54, 55 and 56. The source of the input signals to the decoder 53 is selected by the output signals of the NIC flip-flop 49.

During retrieval of the addressed data from the main memory, the three least significant bit signals from the MAR 41 are compared to the counter output signals. When they are the same, the GMD signal is generated by an AND gate 57 during time pulse $T_2$.

The important characteristics of the LSB circuit 51 are: the three least significant bits of the MAR 41 are decoded into one-out-of-eight word lines when the addressed data word is in one of the memory subsystems; the three least significant bits of the main memory address are taken from the counter when the data word is not in one of the memory subsystems; when the addressed data words are retrieved from the main memory, the word lines and three least significant bits of the main memory address are cycled from binary zero to binary seven (word lines WL1 to WL8).

The operation of the control section shown in FIG. 4 will now be described in detail. Operation of the control section is initiated by the address and start signals from the computer. The start signal causes the timer 43 to generate the fast group of time pulses.

During time pulse $t_1$, the block address portion signals from the MAR 41 are gated to the memory subsystems' digit lines. The $t_1$ signal provides an input signal to an OR gate 61. The output signal of the OR gate 61 enables a group of AND gates 63. These AND gates are primed by the set stages of the MAR 41 so that the block portion of the MAR 41 appears as signals on the output terminals of the group of AND gates 63. Each output signal of an AND gate in the group of AND gates 63 provides an input signal to a different OR gate in a group of OR gates 65. The output signals of the OR gates are coupled to the memory subsystems' digit lines and to the input terminals of another group of AND gates 80. Thus, the time pulse $t_1$ causes the contents of the block portion of the MAR 41 to appear as signals on the memory subsystems' digit lines.

Next, during time pulse $t_2$, the MC signals from the memory subsystems are sensed to set the PNIC flip-flop 71 if the block address portion of the MAR 41 does not match the associative word of any subsystem. The $t_2$ signal provides an input signal to the OR gate 61 to keep the block address signals of the MAR 41 on the digit lines to the memory subsystems.

The MC line from each memory subsystem provides an input signal to an OR gate 73 (upper right of FIG. 4). If any MC input signal to the OR gate 73 has a value of 1, the OR gate's output signal will be 1 and will be inverted to a 0 signal by an inverter 74. The time pulse $t_2$ provides the clock input signal for the PNIC flip-flop 71 and the SET MC signal to the memory subsystems. If no MC signal has a value of 1 (indicating the addressed data is not in one of the subsystems), the output signal of the inverter 74 will be a 1 and the $t_2$ signal will set the flip-flop 71. The F3' signal provides the clock input signal to the NIC flip-flop 49 to set it if the PNIC flip-flop 71 is set, or to reset it if the PNIC flip-flop 71 is reset.

At this point, the operation can continue in either one of two ways, depending on whether the addressed data word is in one of the memory subsystems or not as indicated by the state of the PNIC flip-flop 71.

First, assuming that the data word is in one of the memory subsystems, time pulse $t_2$ will reset the PNIC flip-flop 71 and the Q' output signal PNIC' will have a value of 1. The signal F3' (after time pulse $t_{3b}$) will reset the NIC flip-flop 49. This will cause the timer 43 to generate the fast group of time pulses. It will also cause the LSB circuit 51 to decode the three least significant bits of the MAR 41 to activate one of the memory subsystems' eight word lines.

The time pulse $t_{3a}$ will enable an AND gate 76 which has been primed by the Q' output signal of the PNIC flip-flop 71. The output signal of the AND gate 76 performs two functions: it provides the RD signal to the memory subsystems; and it sets the DR flip-flop 45 through the OR gate 79. The RD signal, in addition to being transmitted to the memory subsystems, is applied to an input terminal of an OR gate 78. The output signal of the OR gate 78 enables the group of AND gates 80 to gate the data signals, which are on the digit lines, into the MDR 47. The Q output signal of the DR flip-flop 45 provides a signal to the computer to indicate that the addressed data word is ready. Also, the Q output signal of the DR flip-flop 45 primes an AND gate 82 which is enabled by the F3' signal. The output signal of the AND gate 82 stops the timer 43 at the end of the time pulse sequence. Thus, when the data is found to be in one of the memory subsystems, it is retrieved and transmitted to the computer via the MDR 47.

Next, assuming that the addressed data word is not in one of the memory subsystems, the PNIC flip-flop 71 will be set by the time pulse $t_2$. The Q output signal of the PNIC flip-flop 71 will have a value of 1 and the Q' output signal, a value of 0. The 0 value of the PNIC' signal will inhibit the AND gate 76 so that the RD signal will not be generated nor will the DR flip-flop 45 be set.

At time pulse $t_{3a}$, and AND gate 85, having as its input signals the time pulse $t_{3a}$ and the PNIC signal, will generate the WC signal to the memory subsystems to write the block address portion of the MAR 41 into the associative word register of the memory subsystem having its FIFO flip-flop set. The WC signal also provides an input signal to the OR gate 61 to keep the block address portion of the MAR 41 on the digit lines via the group of AND gates 63 and the group of OR gates 65.

The signal F3' at the end of the time pulse sequence will cause the NIC flip-flop 49 to be set. The Q output signal of the NIC flip-flop 49 will cause the timer 43 to generate the slow group of time pulses ($T_1$ through $T_{3b}$). Also, the activated word line will be determined by the counter in the LSB circuit 51 instead of the three least significant bits of the MAR 41. The counter in the LSB circuit 51 will initially be reset to 0.

During the time pulse $T_1$, the main memory will be addressed by the block address portion of the MAR 41 and the three least significant bits generated by the counter in the LSB circuit 51. The time pulse $T_1$ enables a group of AND gates 88 to transmit to the main memory the block address portion of the MAR 41. The time pulse $T_1$ also enables a group of AND gates 89 to transmit the three least significant bits of the main memory address from the LSB circuit 51.

During the time pulse $T_2$, the data signals from the main memory are gated to the memory subsystems' digit lines by a group of AND gates 91 through the group of OR gates 65. The time pulse $T_2$ also generates the WR signal to the memory subsystems so that the data signals on the digit lines will be written into the word register selected by the LSB circuit 51 in the memory subsystem having its FIFO flip-flop set.

If the three least significant bits generated by the counter in the LSB circuit 51 match the least three significant bits of the MAR 41, the GMD signal will be generated by the AND gate 57 (FIG. 5) during time pulse $T_2$. The GMD signal furnishes an input signal to the OR gate 78, the output signal of which enables the group of AND gates 80 so that the data signals on the digit lines will be written into the MDR 47. The DR flip-flop 45, however, will not be set until all eight words in the addressed data block have been retrieved from the main memory and stored in the designated memory subsystem.

The time pulse $T_{3a}$ increments the counter in the LSB circuit 51. This will cause the next sequential word line to the memory subsystems to be activated. The next sequential data word in the addressed data block will be retrieved from the main memory because the three least significant bits supplied to the main memory address will have been incremented by one. When the last data word has been retrieved, the counter will be triggered to 0, causing the 0/8 signal from the LSB circuit 51 to prime an AND gate 99. Another input terminal of the AND gate 99 is already primed by the Q output signal of the NIC flip-flop 49 so that the time pulse $T_{3a}$ will enable the AND gate 99. Its output signal will provide the SHIFT FIFO signal to the memory subsystems and set the DR flip-flop 45 through the OR gate 79.

At the end of the time pulse sequence, the signal F3' from the timer 43 will reset the NIC flip-flop 49 because the PNIC flip-flop 71 will have been reset by the SHIFT FIFO signal. The stop signal to the timer 43 is generated by the AND gate 82 which has as input signals the Q output signal of the DR flip-flop 45 and the signal F3'. With the NIC flip-flop reset, the timer 43 will generate the fast group of time pulses at the occurrence of the next start signal. The control section is now ready to begin another cycle upon receipt of the signals from the computer.

It has been shown how the control section causes the data to be retrieved from the main memory and written to the appropriate memory subsystem when the address data block is not stored in any of the memory subsystems. This completes the description of the operation of the control section.

The advantages of the invention include simplicity, expandibility, and adaptability to integrated circuit techniques. The simplicity of the invention is a result of having only one set of digit lines coupled to each memory subsystem which carries the data to and from the data storage registers and carries the block portion of the address to the memory subsystems. The memory system is expandible because of the few connections required to add a new memory subsystem: only the FIFO IN and FIFO OUT lines need be interrupted; the MC signal line from the added memory subsystem must be connected to a separate input terminal of the OR gate 73; and all other connections to the memory subsystem are made in parallel.

There are several modifications to the invention which are readily apparent to one skilled in the art. The associative word register, for instance, can store the entire address and each memory subsystem store only one word. This would simplify the internal arrangement of the memory subsystem and would be faster because only one word need be retrieved from the main memory. The probability that an addressed data word is in one of the memory subsystems, however, would be reduced by the above modifications.

Various changes in the details and arrangements of parts which have been described and illustrated in order to explain the nature of the invention may be made by those skilled in the art within the principle and scope of the invention as expressed in the appended claims.

What is claimed is:

1. In a memory system including addressing means, control means, main storage means and data register means, said addressing means partitioned into a word select portion and a block select portion, at least one memory subsystem comprising the combination of:

data storage means for storing data, said means comprising a plurality of elements arranged in rows and columns, each row for storing a data word and each column comprising a digit position;

associative word means for storing an address word having a digit corresponding to at least one digit position;

word select means responsive to the word select portion of the addressing means for selecting a row storing a data word in all the memory subsystems;

transfer means coupled to the digit positions for transferring address words to the associative word means and data words between said data storage means and said data register means;

comparator means responsive to the transfer means and the associative word means for providing an output signal which indicates when they are the same; and read out means responsive to said output signal of said comparator means for transferring the data word stored in the selected row to the transfer means.

2. The invention set forth in claim 1 further comprising:

write control means for selecting the memory subsystem which is to receive a data word; and write-in means responsive to said control means for transferring data from said main storage means to the data storage means of the memory subsystem indicated by the write control means.

3. The invention as set forth in claim 2 further comprising:

means for causing the addressing means to address successively each word location in a block during a data transfer from the main storage means to the selected memory subsystem whereby each such data transfer causes all the data words in the addressed block in the main storage means to be transferred to the selected data words in the selected memory subsystem; and means for transferring the contents block select portion of the addressing means to the address word means of the selected memory subsystem.

4. The invention as set forth in claim 3 wherein the write control means is comprised of a shift register in each memory subsystem arranged so that each memory subsystem receives data words cyclically.

* * * * *